(12) United States Patent
Shoaib et al.

(10) Patent No.: US 12,516,263 B2
(45) Date of Patent: Jan. 6, 2026

(54) COMPOSITIONS FOR REDUCING FRICTION OR STICTION OF A SURFACE, METHODS AND ARTICLES COMPRISING THE SAME

(71) Applicant: actnano, Inc., Boston, MA (US)

(72) Inventors: Tooba Shoaib, Cambridge, MA (US); Peter J. Kim-Santos, Somerville, MA (US); Sruti Balasubramanian, Quincy, MA (US); Justin Kleingartner, Boston, MA (US)

(73) Assignee: ACTNANO, INC., Malden, MA (US)

( * ) Notice: Subject to any disclaimer, the term of this patent is extended or adjusted under 35 U.S.C. 154(b) by 0 days.

(21) Appl. No.: 18/441,570

(22) Filed: Feb. 14, 2024

(65) Prior Publication Data

US 2024/0279564 A1     Aug. 22, 2024

Related U.S. Application Data

(60) Provisional application No. 63/445,538, filed on Feb. 14, 2023.

(51) Int. Cl.
    *C10M 107/50*     (2006.01)
    *C08G 77/00*     (2006.01)
    (Continued)

(52) U.S. Cl.
    CPC ........... *C10M 107/50* (2013.01); *C08G 77/08* (2013.01); *C08G 77/18* (2013.01); *C08G 77/20* (2013.01);
    (Continued)

(58) Field of Classification Search
    CPC ........ C08G 77/08; C08G 77/18; C08G 77/20; C08G 77/28; C08G 77/46; C08G 77/80;
    (Continued)

(56) References Cited

U.S. PATENT DOCUMENTS 6,706,408 B2 *   3/2004   Jelle ..................... A61L 29/085
                                                427/457
8,097,569 B2 *   1/2012   Saiki ................... C09D 179/08
                                                106/400

(Continued)

FOREIGN PATENT DOCUMENTS

EP          0962919 A1     12/1999
WO    2011060238 A1     5/2011

(Continued)

OTHER PUBLICATIONS

International Search Report and Written Opinion for International Application No. PCT/US2024/015773 dated Jun. 12, 2024, 10 pages.

*Primary Examiner* — James C Goloboy
(74) *Attorney, Agent, or Firm* — Finnegan, Henderson, Farabow, Garrett & Dunner, LLP

(57) ABSTRACT

A composition for reducing friction or stiction of a surface is disclosed. The composition comprises at least one organosilane, at least one organophosphorus, or a combination of at least one organosilane and at least one organophosphorus. The composition further comprises at least one polymer. Methods of applying the composition to a surface are also disclosed. Non-limiting examples of surfaces to which the composition can be applied include metal, metal alloys, metal oxide, glass, ceramic, or plastic substrates, and combinations thereof. Articles comprising at least one surface having been treated with the composition are also disclosed. Non-limiting examples of such articles include windows, watches and watch bands, screens, monitors, high-touch surfaces, electronic products, housing for electronics, and combinations thereof. Such articles can also exhibit enhanced hydrophobicity and/or anti-corrosion properties compared to untreated articles.

31 Claims, 2 Drawing Sheets

(51) Int. Cl.
    *C08G 77/08*       (2006.01)
    *C08G 77/18*       (2006.01)
    *C08G 77/20*       (2006.01)
    *C08G 77/28*       (2006.01)
    *C08G 77/46*       (2006.01)
    *C10N 20/02*       (2006.01)
    *C10N 20/04*       (2006.01)
    *C10N 50/00*       (2006.01)
    *C10N 50/02*       (2006.01)

(52) U.S. Cl.
    CPC ............. *C08G 77/28* (2013.01); *C08G 77/46* (2013.01); *C08G 77/80* (2013.01); *C10M 2201/061* (2013.01); *C10M 2203/1006* (2013.01); *C10M 2205/0206* (2013.01); *C10M 2229/0435* (2013.01); *C10M 2229/0465* (2013.01); *C10M 2229/0475* (2013.01); *C10M 2229/0535* (2013.01); *C10N 2020/02* (2013.01); *C10N 2020/04* (2013.01); *C10N 2050/02* (2013.01); *C10N 2050/023* (2020.05)

(58) Field of Classification Search
    CPC .......... C10M 107/50; C10M 2201/061; C10M 2203/1006; C10M 2205/0206; C10M 2229/0435; C10M 2229/0465; C10M 2229/0475; C10M 2229/0535; C10N 2020/02; C10N 2020/04; C10N 2050/02; C10N 2050/023; B05D 1/18; B05D 5/08; B05D 2202/10; C08K 5/49; C08K 5/54; C08K 2003/3009; C08K 2003/382; C09D 5/00; C09D 7/61; C09D 7/63

See application file for complete search history.

(56) References Cited

U.S. PATENT DOCUMENTS

| | | | |
|---|---|---|---|
| 2009/0126404 A1* | 5/2009 | Sakhrani | ............. C03C 17/3405 65/30.1 |
| 2015/0361274 A1 | 12/2015 | Domes et al. | |
| 2021/0317379 A1* | 10/2021 | Hayashi | ............... C10M 107/04 |
| 2022/0041950 A1* | 2/2022 | Rangwala | ............ C10M 177/00 |
| 2022/0135841 A1* | 5/2022 | Bates | ....................... C09G 3/00 427/508 |

FOREIGN PATENT DOCUMENTS

| | | |
|---|---|---|
| WO | 2015091802 A1 | 6/2015 |
| WO | 2021226699 A1 | 11/2021 |

\* cited by examiner

COMPOSITIONS FOR REDUCING FRICTION OR STICTION OF A SURFACE, METHODS AND ARTICLES COMPRISING THE SAME

CROSS-REFERENCE TO RELATED APPLICATIONS

This application claims the benefit of priority to U.S. Provisional Application Ser. No. 63/445,538, filed on Feb. 14, 2023, the contents of which are incorporated herein by reference in their entirety.

TECHNICAL FIELD

The present disclosure generally relates to the field of compositions for decreasing at least one of friction or stiction of a surface, as well as methods of using such compositions. The present disclosure also relates to articles having at least one treated surface comprising the disclosed composition.

BACKGROUND

Perfluorinated polymers along with fluoroalkane silanes are abundantly used as surface treatments for metals, metal alloys, and metal oxides to render them hydrophobic, and/or omniphobic. A secondary and synergistic effect of this decrease in surface energy is it also drastically reduces stiction (adhesion) and friction. While these coatings work well at reducing friction and wear at a sliding interface, fluorine-based tribological coatings and surface treatments are becoming increasingly regulated. Recent evidence has shown the harmful effects fluorine-based solutions can incur on humans and our environment. In light of the harmful effects associated with these chemicals, the European Commission (EC) has proposed a ban on all per- and polyfluoroalkyl substances, which is expected to come into effect in 2026. With a plethora of fluorinated tribological coatings currently in the market for consumer goods, where their contact with humans and the environment is inevitable, there is now a strong push in the industry to switch to more human- and environmentally-friendly alternatives.

While a handful of alternative tribological coatings exist, they fail to offer the same performance as their fluorinated counterparts. Solutions based on organosilanes and organophosphorus compounds typically have low shelf-life stability, are easily degraded or worn off during use, and provide inferior lubricity to the coated substrate. Additionally, conventional lubricants such as those based on a layer of liquid oil or dry powders can be easily removed from a substrate or can be transferred to users in the case of high-touch applications. Therefore, existence of a surface-bound material that can reduce friction or stiction and does not contain fluorine is an unmet need.

The disclosed composition, method of using it to form a surface having reduced friction or stiction, and article comprising the surface overcome one or more of the problems set forth above and/or other problems of the prior art.

SUMMARY

Consistent with some disclosed embodiments, compositions for decreasing at least one of friction or stiction of a surface are disclosed. In some embodiments, the composition comprises: a first part comprising: (a) at least one organosilane; (b) at least one organophosphorus; or (c) a combination of at least one organosilane and at least one organophosphorus. The composition disclosed herein also comprises a second part comprising at least one polymer. In some embodiments, (a), (b) or (c) of the first part is configured as an attached layer on the surface, and the at least one polymer of the second part is adjacent to the attached layer, wherein the first part and the second part of the composition are found in an amount sufficient to decrease friction, stiction or both, of the surface relative to the surface in untreated form.

Consistent with some embodiments, there is disclosed a method of decreasing at least one of friction or stiction of a surface, the method comprising applying to the surface of a material, a composition as described herein. For example, the method uses a composition comprising: a first part comprising: (a) at least one organosilane; (b) at least one organophosphorus; or (c) a combination of at least one organosilane and at least one organophosphorus. The composition disclosed herein also comprises a second part comprising at least one polymer. In some embodiments, (a), (b) or (c) of the first part is configured as an attached layer on the surface, and the at least one polymer of the second part is adjacent to the attached layer, wherein the first part and the second part of the composition are found in an amount sufficient to decrease friction, stiction or both, of the surface relative to the surface in untreated form.

Consistent with some embodiments, there is disclosed an article having at least one surface having a surface treatment thereon, the surface treatment causing the at least one surface to exhibit reduced friction or stiction. The surface treatment comprises a composition as described herein. For example, the composition comprises: a first part comprising: (a) at least one organosilane; (b) at least one organophosphorus; or (c) a combination of at least one organosilane and at least one organophosphorus. The composition disclosed herein also comprises a second part comprising at least one polymer. In some embodiments, (a), (b) or (c) of the first part is configured as an attached layer on the surface, and the at least one polymer of the second part is adjacent to the attached layer, wherein the first part and the second part of the composition are found in an amount sufficient to decrease friction, stiction or both, of the surface relative to the surface in untreated form.

BRIEF DESCRIPTION OF THE DRAWINGS

The accompanying drawings, which are incorporated in and constitute a part of this specification, illustrate some disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

DETAILED DESCRIPTION

Figure 1:
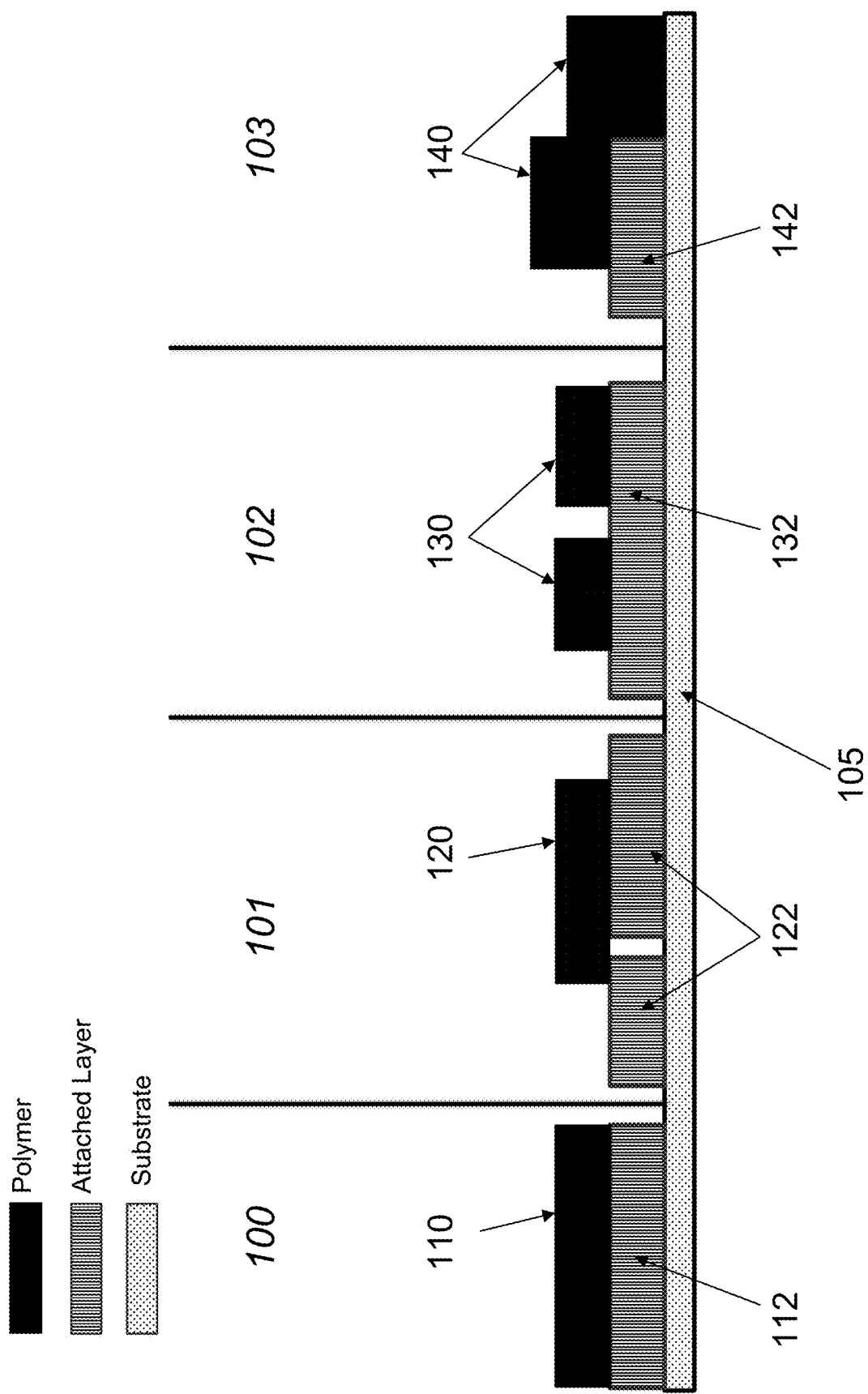
FIGS. 1A to 1D are schematic drawings showing cross-sectional views of various, non-limiting configurations of the attached layer and adjacent polymer on a substrate, consistent with various disclosed embodiments.

This disclosure presents a few exemplary embodiments with the understanding that features of the exemplary embodiments may be combined with other disclosed features or may be incorporated into compositions, methods of using such compositions, or embodiments not described herein while still remaining within the scope of this disclosure. For convenience, any form of the word "embodiment" as used herein is intended to refer to at least one embodiment of this disclosure.

Definitions

As used herein "friction" is intended to mean dynamic or kinetic friction, and thus refers to a resistive force that must be overcome to make a surface or object, which is already in motion, continue to move, or slide against another surface, object, or a medium in a linear, rotary, or reciprocating motion.

As used herein "stiction", is intended to mean static friction and thus refers to the force that resists the disengagement of stationary surfaces, or objects, that are in contact with one another. Stiction may be influenced by the age of the contact, and the load acting on the contact.

As used herein "lubricant" refers to a composition that when applied on a substrate or a surface, results in the reduction of friction or stiction, relative to the bare substrate or surface, of the substrate's surface with respect to other contacting surfaces, objects, or mediums.

As used herein a "polymer" refers to a molecule comprising at least two monomer molecules reacted together to form a larger molecule.

As used herein "weight percent" or "wt %" refers to the ratio of the weight of a component in the composition with respect to the total weight of the composition in percentage form.

As used herein "physisorption" refers to adsorption of a molecule to a surface led by van der Waals forces. In some embodiments, physisorption refers to the attachment of the lubricant composition, or part of the composition, such as the polymer, to the substrate's surface, and/or the attached layer.

As used herein an "additive" refers to a compound that enhances various performance metrics of the composition. In some embodiments, this could entail enhancing the corrosion resistance and/or the lubrication performance of the composition when added in appropriate quantities. In further embodiments, additives such as two-dimensional materials, or particles can be included in the composition to improve dynamic or sliding friction. In additional embodiments, corrosion inhibitors in the form of metal halides, triazoles, or metal passivators could be added to prevent substrate degradation in corrosive environments.

As used herein "corrosion resistance" refers to the ability of a material, or the surface of a material, to resist damage and deterioration when exposed to environmental conditions. In some embodiments, the environmental conditions could be high humidity or moisture, heat, exposure to liquids such as water, high or low pH solutions, or liquids with high salt concentrations.

As used herein "attached layer" refers to a part of a composition that interacts with the surface of a substrate. The interaction can be non-covalent, covalent, or a combination of both. The said layer can exist as a continuous or non-continuous (i.e., providing varying coverage) layer on the treated surface.

As used herein "adjacent to" refers to two elements of a composition which share an interface with one another. This interface may be a sharp, discontinuous change in composition, or it may be a diffuse interface with some interdiffusion or miscibility between the two elements.

As used herein "two-dimensional morphology (or material)" refers to materials with a layered structure that can slide easily against each other upon application of a shear force providing a lubricating effect. In some embodiments, a representative two-dimensional material is a laminate, such as hexagonal boron nitride (hBN), consisting of covalently bonded boron and nitrogen atoms in an atomically thin layer, with van der Waals interactions between the multiple layers.

As used herein "lubricating emulsion" refers to an additive containing at least one immiscible liquid dispersed in another liquid, which can impart increased lubricity to a surface.

As used herein "silane" refers to any molecule comprising a silicon atom attached to four functional groups, where at least one of the functional groups is a leaving group.

As used herein "leaving group" refers to a functional atom or group of atoms on a molecule, which is intended to react and leave the molecule to allow for covalent bonding to another atom, molecule or surface. In some cases, the leaving group on the molecule reacts with water and is replaced on the silane with a silanol group (Si—OH). The silanol group can remain on the molecule or serve as an intermediate for subsequent reactions.

As used herein, a "multipodal" silane is a molecule with two or more silane functionalities in it. For example, a dipodal or tripodal silane has two or three silicon groups, respectively, with leaving groups bound to the silicon atom.

As used herein "organosilane" refers to a molecule with at least one silane attached to it.

The disclosure describes a coating for a variety of surfaces, such as metals and metal alloys, including stainless steels, glass, ceramics, and plastics, comprising organosilanes, organophosphorus compounds, and combinations thereof. Additional two-dimensional materials or lubricating emulsions or oils can also be included in the final composition to further reduce sliding friction.

Consistent with some embodiments, there is disclosed a composition for decreasing at least one of friction or stiction of a surface. In some embodiments, the composition comprises: a first part comprising: (a) at least one organosilane; (b) at least one organophosphorus; or (c) a combination of at least one organosilane and at least one organophosphorus. The composition disclosed herein also comprises a second part comprising at least one polymer. In some embodiments, (a), (b) or (c) of the first part is configured as an attached layer on the surface, and the at least one polymer of the second part is adjacent to the attached layer, wherein the first part and the second part of the composition are found in an amount sufficient to decrease friction, stiction or both, of the surface relative to the surface in untreated form.

In some embodiments, the at least one organosilane is a molecule with at least one leaving group, such as an alkoxy or a chloride group.

In some embodiments, the at least one organosilane has at least one group that is not a leaving group, such as an alkyl (which may have between 1 to 100 carbons), aromatic, silane, silicone, unsaturated (vinyl), epoxy, thiol, or cyclic group.

In some embodiments, the first part of the composition comprises at least one organosilane comprising only leaving groups and at least one organosilane comprising at least one non-leaving group, wherein the weight ratio of silanes with all leaving groups to silanes with at least one non-leaving group ranges between 1 to 100 and 10 to 1.

In some embodiments, the weight ratio of silanes with only leaving groups to silanes with at least one non-leaving group could be about 1:10, such as 1:8, or 1:6 or 1:3, and could even be 1:2.

In some embodiments, the organosilane includes an alkyl group and comprises dodecyl triethoxysilane, octadecyl trimethoxysilane, octadecyltriethoxysilane, hexadecyltrichlorosilane, or derivatives of those compounds.

In some embodiments, the organosilane includes an aromatic group and comprises 1-napthyltrimethoxysilane, p-tolyltrimethoxysilane, phenyltriethoxysilane, benzyltriethoxysilane, or derivatives of those compounds.

In some embodiments, the organosilane includes an unsaturated (vinyl) group and comprises vinyltrimethoxysilane, allyltrimethoxysilane, or derivatives of those compounds.

In some embodiments, the organosilane includes a thiol group and comprises 3-(trimethoxysilyl)propanethiol, 11-mercaptoundecyltrimethoxysilane, bis[3-(triethoxysilyl)propyl]disulfide, bis[3-(triethoxysilyl)propyl]tetrasulfide, or derivatives of those compounds.

In some embodiments, the organosilane includes an epoxy group and comprises 2-(3,4-epoxycyclohexyl)ethyltrimethoxysilane, (3-glycidoxypropyl)trimethoxysilane, or derivatives of those compounds.

In some embodiments, the organosilane includes a cyclic group and comprises cyclohexyltrichlorosilane, cyclopentyltrimethoxysilane, cyclopentyltrichlorosilane, or derivatives of those compounds.

In some embodiments, the organosilane includes an additional silane group and comprises 1,2-bis(triethoxysilyl)ethane, 1,8-bis(triethoxysilyl)octane, bis(trimethoxysilylethyl)benzene, 1,2-bis(trimethoxysilyl)decane, 1,6-bis(trimethoxysilyl)hexane, tris(triethoxysilylpropyl)amine or derivatives of those compounds.

In some embodiments, the organophosphorus comprises a molecule that has at least one group comprising an alkyl, aromatic, silicone, unsaturated (vinyl), epoxy, thiol, phosphonic acid, or cyclic group. In some embodiments, the alkyl group has between 1 to 100 carbons. Additionally, in some embodiments, the organophosphorus comprises methyl phosphonic acid, (2,4-xylyl)phosphonic acid, octadecylphosphonic acid, (Aminomethyl)phosphonic acid, 6-phosphonohexanoic acid, hexadecylphosphonic acid, n-Dodecylphosphonic acid, (12-phosphonododecyl)phosphonic acid, 1,4-phenylenebis(phosphonic acid), N,N'-2-methylpiperazinebis(methylene phosphonic acid), or combinations thereof.

In some embodiments, the second part comprises a polymer with a molecular weight of 1 kDa to 10000 kDa. The polymer may also have a kinematic viscosity of 1 to 10000 cSt when taken on its own.

In some embodiments, the at least one polymer comprises a silicone, polyolefin, polystyrene, rubber, wax, polyether, copolymers thereof, or combinations thereof.

In some embodiments, the silicone comprises polydimethylsiloxane, polyphenylsiloxanes, copolymers thereof, or combinations thereof.

In some embodiments, the polyolefin comprises polyethylene, polypropylene, polybutene, polyisobutylene, polyisoprene, copolymers thereof, or combinations thereof.

In some embodiments, the wax comprises waxes based on ethylene bis(stearamide), carnauba wax, lanolin, is part of a wax emulsion, or combinations thereof.

In some embodiments, the polymer further includes hydroxyl, silanol, amine, aldehyde, or thiol functional groups, or combinations thereof.

In some embodiments, the composition further comprises at least one solvent in an appropriate amount for dissolving the first part, the second part, or both. In further embodiments, the solvent is a polar solvent, a nonpolar solvent, or mixtures thereof. The non-polar solvent may be selected from methylcyclohexane, isoparaffinic solvents, mineral spirits, or mixtures thereof. The polar solvent may be selected from water, ethanol, methanol, ammonia, hydrofluoric acid, acetic acid, or mixtures thereof. In one non-limiting example, the at least one solvent comprises both ethanol and methylcyclohexane. In some embodiments, the at least one solvent comprises a mixture of at least one polar and at least one nonpolar solvent comprising a volume ratio of nonpolar solvent(s) to polar solvent(s) of between 10 to 1 and 1 to 10.

In some embodiments, the ratio of the nonpolar to the polar solvent could be about 80:20, such as 75:25, or 70:30, and can even be 65:35.

The at least one solvent may comprise 2 to 99.9 weight percent of the composition. In some embodiments, the at least one solvent may comprise 5 to 99 weight percent of the composition, such as from 50 to 98 weight percent of the composition, such as 60 to 97 weight percent of the composition, such as 75 to 96 weight percent of the composition, such as 80 to 95 weight percent of the composition, such as 85 to 94 weight percent of the composition, such as 90 to 93 weight percent of the composition, or even 91 to 92 weight percent of the composition.

In some embodiments, the composition may be defined by certain amounts or ratios of the first and second parts. For example, the total amount of the first and the second part combined typically constitutes 0.1 to 98 weight percent of the composition. In some embodiments, the total amount of the first and second part may comprise 1 to 95 weight percent of the composition, such as from 2 to 50 weight percent of the composition, such as from 3 to 40 weight percent of the composition, such as 4 to 25 weight percent of the composition, such as 5 to 20 weight percent of the composition, such as 6 to 15 weight percent of the composition, such as 7 to 10 weight percent of the composition, or even 8 to 9 weight percent of the composition. In addition, the weight ratio of the first part to the second part may range between 10 to 1 and 1 to 10. In some embodiments, the weight ratio of the first part to the second part could be about 10:1, such as 8:1, such as 6:1, or 3.8:1 and could even be 3:1.

In some embodiments, the organophosphorus may comprise 0.01 to 90 weight percent of the first part, such as 0.1 to 80 weight percent, such as 0.5 to 40 weight percent, such as 1.0 to 20 weight percent, such as 1.5 to 10 weight percent, such as 1.6 to 4 weight percent of the first part of the composition.

In some embodiments, the organosilane may comprise from 10 to 99.99 weight percent of the first part of the composition, such as from 50 to 99.5 weight percent, such as 70 to 99.2 weight percent, such as 85 to 99.0 weight percent, such as 90 to 98.5 weight percent of the first part of the composition.

In addition to decreasing at least one of friction or stiction of a surface, the disclosed composition may impart other benefits to a surface on which it is applied, such as enhanced hydrophobicity and/or enhanced corrosion resistance to the surface when compared to the surface in untreated form. For example, when applied to a surface, the composition may show an increase in water contact angle on the surface compared to an untreated surface, thereby evidencing enhanced hydrophobicity. The composition may also impart enhanced anti-corrosion properties to a treated surface when the surface is exposed to salt water, sebum, sweat, damp heat or combinations thereof, compared to the surface in untreated form.

In some embodiments, the composition may further comprise one or more additives, such as, but not limited to, triazole derivatives, hindered phenols, metal halides, and thioethers, or combinations thereof.

In some embodiments, the composition may further comprise a material having a two-dimensional morphology. Materials with a two-dimensional morphology are those that exhibit a flat, sheet-like structure in one or more dimensions. Non-limiting examples of the material having a two-dimensional morphology that may be used herein include hexagonal boron nitride (hBN), molybdenum disulfide (MOS), graphene or combinations thereof.

In some embodiments, one or more of the silanes may comprise one, two, three, or four leaving groups comprising alkoxy or chloride groups. Most silanes can exist as derivatives of each other, where the molecules are similar to one another, but are comprised of different leaving groups. Some examples of silanes with four non-leaving groups include tetraethyl orthosilicate and tetramethyl orthosilicate as shown below:

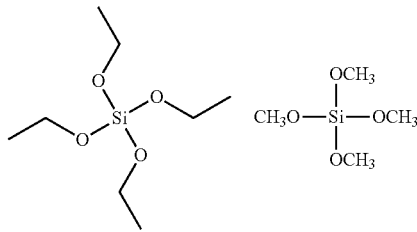

In some embodiments, the leaving group may be ethoxy, methoxy, or chloride, as shown below:

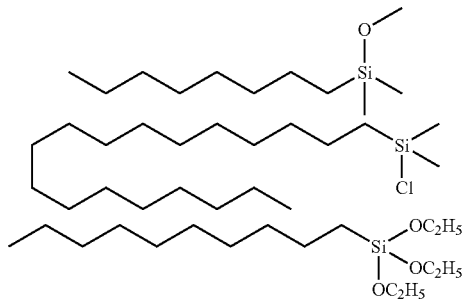

In some embodiments, the non-leaving group functionality has reactive or non-reactive end terminal groups such as alkyl, aromatic, silane, silicone, unsaturated (vinyl), epoxy, thiol, cyclic, or norbornene groups.

In some embodiments, a group that is not a leaving group may be bound to one or more of the silanes, and that group may be an alkyl group with carbon chain length ranging from 1 to 100 carbons. Non-limiting examples for silanes that can be used include methyltrimethoxysilane, which has one carbon in the non-leaving functional group, octyltrimethoxysilane, which has 8 carbons in the non-leaving functional group, or hexadecyltrimethoxysilane, which has 16 carbons in the non-leaving functional group.

In some embodiments, the non-leaving group may have an aromatic functionality, which refers to a functional group that has a benzene group or a related ring structure. Some non-limiting examples include 1-napthyltrimethoxysilane, p-tolyltrimethoxysilane, phenyltriethoxysilane, benzyltriethoxysilane, or derivatives of those compounds.

In some embodiments the non-leaving group is a vinyl group which has a double bond or an unsaturated functionality. Some non-limiting examples include vinyltrimethoxysilane, allyltrimethoxysilane, or derivatives of those compounds.

In some embodiments the non-leaving group contains a thiol functionality, which refers to functional groups with a sulfur atom in them. Some non-limiting examples include 3-(trimethoxysilyl)propanethiol, 11-mercaptoundecyltrimethoxysilane, bis[3-(triethoxysilyl)propyl]disulfide, bis[3-(triethoxysilyl)propyl]tetrasulfide, or derivatives of those compounds.

In some embodiments the non-leaving group contains an epoxy functionality which refers to a functionality comprising of a three membered ring with an oxygen atom in it. Some non-limiting examples are 2-(3,4-epoxycyclohexyl)ethyltrimethoxysilane, (3-glycidoxypropyl)trimethoxysilane, or derivatives of those compounds.

In some embodiments the non-leaving groups contain a cyclic group which refers to a series of carbon atoms arranged in a ring structure. Some non-limiting examples include cyclohexyltrichlorosilane, cyclopentyltrimethoxysilane, cyclopentyltrichlorosilane, or derivatives of those compounds.

In some embodiments, one or more of the silanes may be singular, dipodal, or tripodal. As previously defined, a dipodal or tripodal silane has two or three silicon groups, respectively, with leaving groups bound to the silicon atom. Some non-limiting examples include 1,2-bis(triethoxysilyl)ethane, 1,8-bis(triethoxysilyl)octane, bis(trimethoxysilylethyl)benzene, 1,2-bis(trimethoxysilyl)decane, 1,6-bis(trimethoxysilyl)hexane, tris(triethoxysilylpropyl)amine or derivatives of those compounds. Some examples of multipodal silanes are depicted below.

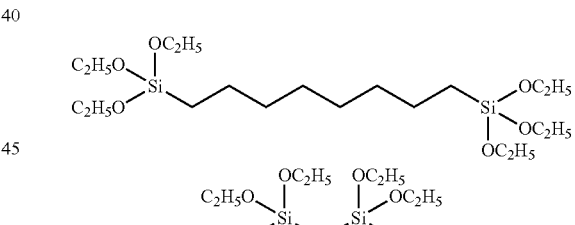

Non-limiting examples of organophosphorus compounds that can be used herein include those having alkyl functional groups with a carbon chain length ranging from 1 to 100 carbons, dipodal organophosphorus compounds, or organophosphorus compounds with a functional group. Examples of such organophosphorus compounds are methyl phosphonic acid, (2,4-xylyl)phosphonic acid, octadecylphosphonic acid, (aminomethyl)phosphonic acid, 6-phosphonohexanoic acid, hexadecylphosphonic acid, n-dodecylphosphonic acid, (12-phosphonododecyl)phosphonic acid, 1,4-phenylenebis(phosphonic acid), N,N'-2-methylpiperazinebis(methylene phosphonic acid), or combinations thereof.

In some embodiments, nonpolar solvents such as methylcyclohexane, isoparaffinic solvents, and mineral spirits can be used. A polar, protic solvent such as ethanol, methanol, isopropanol, other alcohols, ammonia, hydrofluoric acid, acetic acid, other acids, or other similar solvents may be used as a cosolvent as well. The total weight percent of these solvents in the composition can range from 2%-99.9%.

In some embodiments, the solvents may comprise 5 to 99 weight percent of the composition, such as from 50 to 98 weight percent of the composition, such as 60 to 97 weight percent of the composition, such as 75 to 96 weight percent of the composition, such as 80 to 95 weight percent of the composition, such as 85 to 94 weight percent of the composition, such as 90 to 93 weight percent of the composition, or even 91 to 92 weight percent of the composition.

In some embodiments, the ratio of the nonpolar to the polar solvent could be about 80:20, such as 75:25, or 70:30, and can even be 65:35.

Consistent with some embodiments, a pre-treatment step may be used to prepare the surface for the disclosed coating. For example, in some embodiments, prior to the coating application, a surface can be rendered hydrophilic by an appropriate treatment. Such treatments could include plasma treatment, corona treatment, or rinsing in sodium hydroxide. In further embodiments, sufficient application or contact time is used to ensure adsorption and self-assembly of the lubricant composition on the surface during application. In some embodiments, this time can range from 1 minute to 1 hour, such as 1 to 5 minutes, or 5 to 50 minutes, or 10 to 40 minutes, or even 20 to 30 minutes.

In some embodiments, the composition also comprises a polymer, which may be a homopolymer or a copolymer. A homopolymer or copolymer refers to polymers formed from one type of monomer or multiple types of monomers, respectively. In some embodiments, the polymer may be a linear polymer, or it may have a branched, star, or a bottlebrush structure. In further embodiments, the polymer may have a molecular weight between 1 kDa and 10000 kDa, and a kinematic viscosity in pure form (i.e., when constituted on its own, not in combination with other compositional elements) between 1 and 10000 cSt.

In some embodiments, the polymer comprises silicones, polyolefins, polystyrenes, rubbers, waxes, polyethers, In some embodiments, the polymer comprises hydroxyls, silanols, amines, aldehydes, thiols, or a combination of these.

In further embodiments, the silicone may include polydimethylsiloxane (PDMS) or polyphenylsiloxanes, or other similar silicone-base materials. Alternatively, the polymer may be a copolymer containing some subunits comprising these groups.

In some embodiments, the polyolefin may include polyethylene, polypropylene, polybutene, polyisobutylene, polyisoprene, copolymers thereof. Alternatively, the polymer may be a copolymer containing some subunits comprising these groups.

In some embodiments, the wax could include those based on ethylene bis(stearamide), carnauba wax, lanolin, be part of a wax emulsion, or combinations thereof. Alternatively, the polymer may be a copolymer containing some subunits comprising these groups.

In some embodiments, the polyether may include polyoxyproylene or polyoxyethylene. Alternatively, the polymer may be a copolymer containing some subunits comprising these groups.

The coating comprising the composition described herein can be applied as a mixture of the above-mentioned components but also, in a stepwise manner, where first a mixture of silane and organophosphorus compounds ("self-assembling compounds") is applied prior to the modified polymers. In some cases, a final step such as moisture or a heat cure can also be included. For example, in some embodiments, a heat cure is employed to improve the corrosion performance of the treated substrates.

Consistent with some embodiments, there is disclosed a method of decreasing at least one of friction or stiction of a surface, the method comprising applying to the surface of a material, a composition as described herein. For example, the method uses a composition comprising: a first part comprising: (a) at least one organosilane; (b) at least one organophosphorus; or (c) a combination of at least one organosilane and at least one organophosphorus. The composition disclosed herein also comprises a second part comprising at least one polymer. In some embodiments, (a), (b) or (c) of the first part is configured as an attached layer on the surface, and the at least one polymer of the second part is adjacent to the attached layer, wherein the first part and the second part of the composition are found in an amount sufficient to decrease friction, stiction or both, of the surface relative to an untreated surface.

In some embodiments, the method may further comprise at least one precleaning step for the surface before the applying step. For example, in some embodiments, the precleaning step comprises corona treatment, plasma treatment, an acid or base bath, or combinations thereof.

In some embodiments, the material (which surface will be treated with the disclosed method) is selected from a metal, metal alloy, metal oxide, glass, ceramic, plastic, or combinations thereof. In some embodiments, the metal may comprise stainless steel, titanium, aluminum, or combinations thereof.

In some embodiments, the method may further comprise at least one curing step selected from ambient curing, heat curing or high humidity curing. For example, ambient curing may be performed from 1 minute to 7 days, such as 1 hour to 5 days, or 12 hours to 4 days, or 18 hours to 3 days or 1 to 2 days.

In some embodiments, the curing step can contain an ambient cure, where the treated surface or article is exposed to the ambient environment for a few hours to multiple days, depending on the composition. The lubricant composition then reacts with ambient moisture to achieve a full cure on the treated surface. In some embodiments, the curing step can contain a heating step, to shorten cure times, and in some cases, improve corrosion performance.

In some embodiments, the composition may be applied to the substrate by dip coating, spraying, needle dispensing, brushing, or combinations thereof. For example, the dip coating may be performed for a time ranging from 1 minute to 1 hour, such as 5 minutes to 50 minutes, or 10 to 40 minutes, or 20 to 30 minutes.

In some embodiments, the method further includes rinsing the article after applying the composition. For example, in some embodiments, rinsing can be performed with one or more of the solvents described herein, such as a polar solvent, a nonpolar solvent, or mixtures thereof.

As stated, the disclosed method is performed using the composition specifically disclosed above, and generally described herein.

In one embodiment, there is described a synergistic chemistry of the coating, which comprises a solvent, along with non-fluorinated, self-assembling molecules such as alkylsilanes and organophosphorus compounds, and short-chain polymers which can be grafted to the surface, where a significant reduction in surface energy is achieved.

In some embodiments a polymer may be applied as a second adjacent or adsorbed layer, if not included in the first attached layer, where the first attached layer may act as a binder between the substrate and the polymer. Included in this second step may be a heat or a moisture cure of the polymer as well.

In some embodiments, the long-chain silanes and organophosphorus compounds can attach to the substrate. In further embodiments, a decrease in surface energy can occur by this adsorption, while the surface is also rendered hydrophobic due to the alkyl chains. This can be confirmed by a change in water contact angle. For example, in some embodiments there is an increase in contact angle, such as at least 10°, such as at least 15°, at least 20°, at least 25° or at least 30°. In some embodiments, there is a change of in water contact angle of 31° between uncoated and coated substrates. This self-assembled, hydrophobic layer prevents stiction and adhesion during static loading (or prolonged contact with another (mating) surface). Additionally, in the presence of the polymer, the coating provides an interface with a low shear strength, hence mitigating friction during sliding. Addition of the polymer also increases the load capacity of the boundary lubricant, thereby decreasing wear and tear at the surface. In some embodiments, the present disclosure combines synergistic effects of low surface energy, high hydrophobicity, and a dissipation pathway to reduce stiction and sliding on substrates.

Consistent with some embodiments, there is disclosed an article having at least one surface having a surface treatment thereon, the surface treatment causing the at least one surface to exhibit reduced friction or stiction. The surface treatment comprises a composition as described herein. For example, the composition comprises: a first part comprising: (a) at least one organosilane; (b) at least one organophosphorus; or (c) a combination of at least one organosilane and at least one organophosphorus. The composition disclosed herein also comprises a second part comprising at least one polymer. In some embodiments, (a), (b) or (c) of the first part is configured as an attached layer on the surface, and the at least one polymer of the second part is adjacent to the attached layer, wherein the first part and the second part of the composition are found in an amount sufficient to decrease friction, stiction or both, of the surface relative to the surface in untreated form.

In some embodiments, the disclosed article is made of a material or includes a surface that is made of a material selected from metals, metal alloys, metal oxides, glass, ceramics, plastics, or combinations thereof.

In some embodiments, the article includes at least one surface that undergoes linear or rotational movement against another surface, wherein at least one surface has a surface treatment as described herein, thereon. For example, in one non-limiting embodiment, the at least one surface is part of a chain link assembly, bearing, press assembly, hinge or hinge assembly, or combinations thereof.

In some embodiments, at least one surface has prolonged contact with another surface. As used herein, prolonged contact can range up to one year. Such prolonged contact is especially desirable when the treated surface is in contact with a living organ or tissue, such as the skin. Thus, as used herein, in some embodiments, the linear or rotational movement against another surface may include linear or rotational movement against living organ or tissue, such as the skin of a human.

In some embodiments, the at least one surface having a surface treatment thereon is located in an air or water medium.

As stated, the disclosed article includes at least one surface having a surface treatment thereon, the surface treatment comprising a composition specifically disclosed above, and generally described herein.

A non-limiting example of an embodiment disclosed herein is shown in FIGS. 1A to 1D, which are schematic drawings showing cross-sectional views of various, non-limiting configurations of the attached layer and adjacent polymer on a substrate, consistent with various disclosed embodiments. For example, FIG. 1A shows an embodiment 100 comprising a continuous attached layer 112 and adjacent polymer 110 on substrate 105. FIG. 1B shows an embodiment 101 comprising a discontinuous attached layer 122 and continuous adjacent polymer 120 on substrate 105. FIG. 1C shows an embodiment 102 comprising a continuous attached layer 132 and discontinuous adjacent polymer 130 on substrate 105. FIG. 1D shows an embodiment 103 comprising an attached layer 142 and adjacent polymer 140 with non-directional adjacency on substrate 105. FIG. 1D further shows an embodiment where the adjacent polymer 140 can also be adjacent to the substrate 105.

Figure 2:
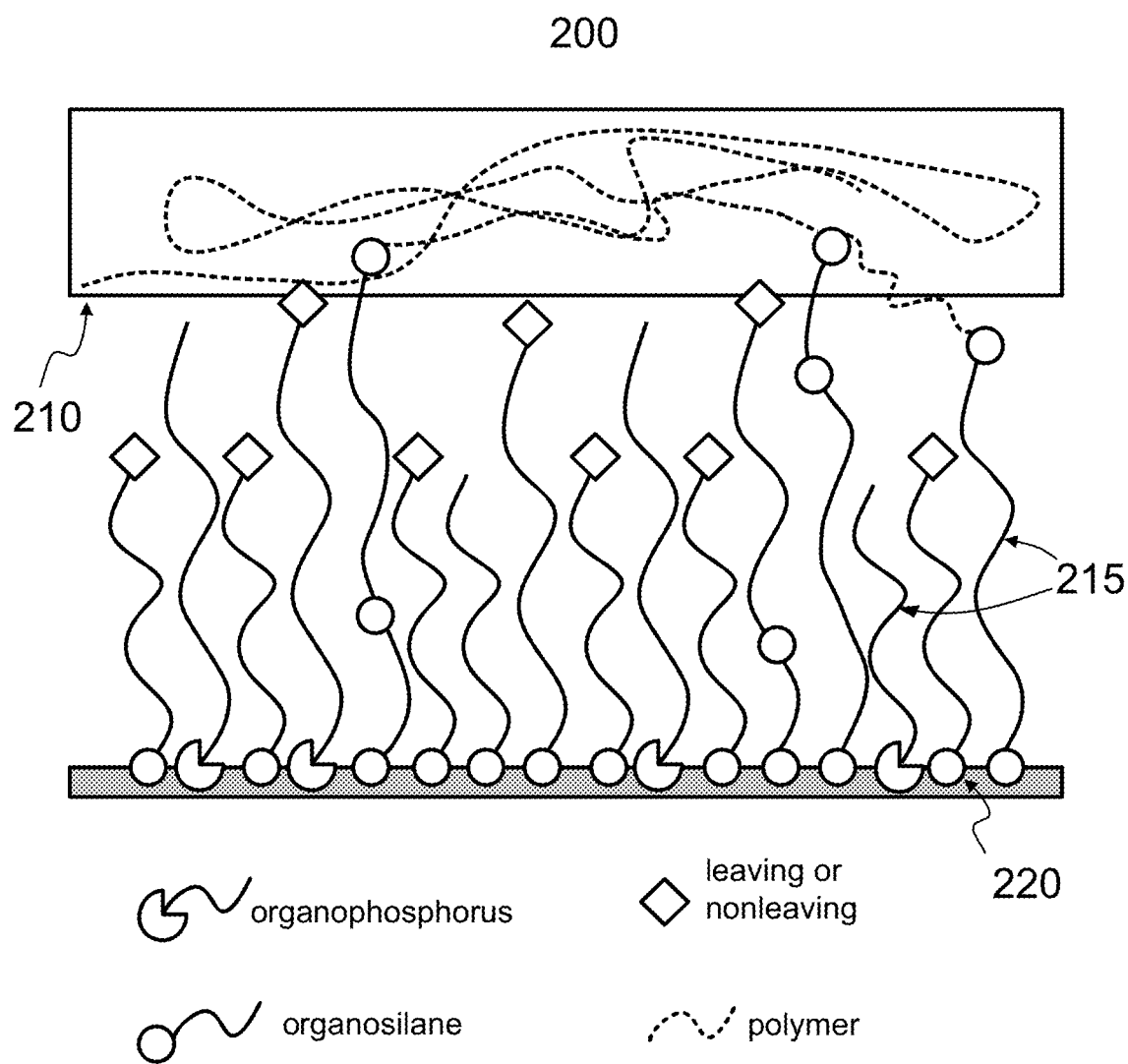
FIG. 2 is a schematic cross-sectional view of a lubricant layer configuration on a treated surface consistent with some disclosed embodiments.

FIG. 2 broadly shows a lubricant layer configuration on a treated surface 200. In this embodiment, there is shown a polymer that is depicted as a physisorbed and/or bonded film 210 adjacent to organosilane and/or organophosphorus compounds 215 that are attached to the surface of an article 220, which is referred to as a treated article. In some embodiments, the polymer 210 can be sheared in linear or rotation directions to create a dissipation pathway. In other embodiments, the polymer 210 can be sheared from the organosilane and/or organophosphorus compounds 215 to create a dissipation pathway to reduce stiction and sliding friction on a hard substrate 220, such as stainless steel or glass.

In some embodiments, the organosilane 215 is a molecule with at least one leaving group comprising an alkoxy or a chloride group and may further include at least one group that is not a leaving group, such as an alkyl, aromatic, multipodal silane, silicone, unsaturated (vinyl), epoxy, thiol, or a cyclic group.

In some embodiments, the organophosphorus 215 is a molecule that has at least one substituent comprising an alkyl, aromatic, silicone, unsaturated (vinyl), epoxy, thiol, phosphonic acid, or cyclic group.

Consistent with some embodiments, and with continued reference to FIG. 2, there may be disclosed a lubricant layer configuration on treated surface 200. In this embodiment, there is shown a silane and polymer, such as copolymer depicted as a physisorbed and/or bonded film 210 adjacent to organosilane and/or organophosphorus compounds 215 that are attached to the surface of an article 220, e.g., referred to as a treated article. In some embodiments, the organosilane includes at least one alkyl group, such as a methyl group. In some embodiments, the polymer 210 can be sheared from the organosilane and/or organophosphorus compounds 215 to create a dissipation pathway to reduce stiction and friction on a hard substrate 220, such as stainless steel or glass.

While not shown in the figures, in some embodiments, additives to enhance the properties of the anti-friction and anti-stiction treatment can also be included in the disclosed composition. For example, to improve lubrication performance, additives such as two-dimensional boron nitride, graphitic materials, ester oils, or wax-based emulsions may be added to the composition. To improve hydrophobicity, hydrophobic nanoparticles such as silicon dioxide may be added to the composition. To improve corrosion resistance benzotriazole or phenolic based passivators and corrosion inhibitors such as metal halides, may be added to the composition.

Testing Methods

As described herein corrosion performance of a substrate can be tested by submerging it in ocean water, salt water, artificial sweat, or exposing it to salt mist or spray according to the ASTM B117 (standardized Salt Fog Test). The substrate can then be inspected for visual signs of corrosion after a specific exposure time, or until corrosion is observed (where the time of first observable corrosion would be the figure of merit). An improvement or enhancement in corrosion performance is measured by comparing the onset of visual corrosion on a treated versus an untreated substrate, where the treated article shows either delayed signs of corrosion or no signs of corrosion compared to an untreated substrate.

The hydrophobicity of a coating may be measured by observing the contact angle a water droplet makes on the surface of the coating. Enhancement in hydrophobicity is measured as an increase in the water contact angle after treatment of the surface with the lubricant composition compared to an untreated surface.

As used herein the decrease in static friction or stiction can be measured by measuring a coefficient of static friction of a treated and an untreated substrate. Measurement is done by placing the substrate on an inclined plane with a variable angle of incline. The minimum angle ($\theta$) at which the treated substrate starts sliding freely is used to calculate the static friction coefficient ($\mu$) by the equation:

$$\mu = \tan(\theta)$$

Reduction in static friction or stiction is measured by comparing resulting static friction coefficient and critical angle of treated and untreated substrates, where the treated substrates should show a decrease in $\mu$ and $\theta$.

As used herein friction, sliding friction, or dynamic friction can be measured using a nanoindenter (e.g., Bruker Hysitron TS 77). The indenter slides against the substrate's surface with a set speed and load and the lateral force experienced by the indenter during the sliding motion is recorded as the friction. In the working examples described herein friction was measured on treated and untreated substrates at up to a maximum load of 100 µN, at a sliding distance of up to 10 µm, and sliding speeds ranging from 0.5 to 100 µm/s. A decrease in friction is measured by comparing the friction force on a treated vs an untreated surface, where the friction measured by the indenter on the treated substrate is less than the friction measured on the untreated substrate.

The features and advantages of the compositions, and methods used to make the same disclosed herein are illustrated by the following examples, which are not to be construed as limiting the scope of the present disclosure in any way.

EXAMPLES

Working Example 1

In this working example a composition comprising dodecyltriethoxysilane (2.3 wt %), octadecylphosphonic acid (0.13 wt %), tetraethoxysilane (2.3 wt %), 1,8-bis(triethoxysilyl)octane (2.3 wt %), silicone polyol copolymer (1.8 wt %) in methylcyclohexane (63 wt %), and ethanol (27 wt %) was applied to a stainless steel substrate by dipping the substrate in the composition for 1 minute, followed by air curing for 24 hours before rinsing with the solvent.

The treated stainless-steel substrate had an average water contact angle of 83° with a standard deviation of 5°. The untreated stainless-steel substrate had an average water contact angle of 62° with a standard deviation of 6°.

The treated substrate shows a 20% to 37% reduction in static friction compared to an untreated surface in the inclined plane method.

Working Example 2. Enhanced Corrosion Resistance

The composition of Example 1 is constituted as described above. However, rather than air curing for 24 hours, the surface of this example is cured under heat at 100° C. for 30 minutes. The heat cured surface is subsequently rinsed with the solvent. The resulting coated surface exhibits enhanced corrosion resistance over a non-treated surface and a treated substrate cured under ambient conditions. The heat-cured substrate showed no signs of visible corrosion up to 72 hours in a salt fog test, while the untreated and ambient-cured substrate showed visible corrosion within 24, and 48 hours, respectively.

Working Example 3. Enhanced Hydrophobicity

This working example describes a lubricant composition prepared in a single non-polar solvent: a composition comprising tetraethoxysilane (4 wt %), dodecyl(triethoxy)silane (2%), (1,8-bis(triethoxysilyl)octane) (2%), silicone copolymer polyol (3 wt %) in a mineral spirit (89%) is applied to a stainless steel substrate by dipping the substrate in the composition for 1 minute followed by air curing for 24 hours after which it is rinsed with the solvent. The resulting coated surface exhibits enhanced hydrophobicity where water contact angle on a stainless-steel surface increased to an average contact angle of 97° with a standard deviation of 3°.

Working Example 4

This working example describes a composition made with the hBN additive (up to 0.5 wt %) in addition to the composition described in Example 3. The substrate to be treated was dipped in the lubricant for 1 minute, followed by air curing for 24 hours. In this example, after the cure step, the surface was not rinsed. The lubricant was qualitatively shown, such as through touch and feel on the skin, to exhibit increased lubricity compared to an untreated surface.

Working Example 5

This working example describes a composition comprising a different ratio of the first and the second part relative to Working Example 1: dodecyl triethoxysilane (1 wt %), tetraethoxysilane (2 wt %), and silicone copolymer polyol (2 wt %) in Methylcyclohexane (95 wt %) was applied to a substrate by dipping the substrate in the said composition for 30 minutes, followed by air curing for 24 hours before rinsing with the solvent. The treated substrate exhibited improved corrosion resistance over a non-treated surface in immersion tests, and ASTM B117 test where no signs of corrosion were observed up to 36 hours, and 72 hours tested, respectively. For reference, an untreated surface corroded in all three tests within the first 24 hours.

Working Example 6

This working example describes a first part of the composition without the organophosphorus compound: A composition comprising of dodecyl(triethoxy)silane (5.5 wt %), silicone polyol with pendant polyoxypropylene chains (1.7 wt %), tetraethoxysilane (6 wt %), 1 8-bis(triethoxysilyl)octane (3.5 wt %) in methylcyclohexane (83.3 wt %) was applied to a stainless steel substrate by dipping it in the lubricant for 1 minute, followed by air curing for 24 hours before rinsing with the solvent.

The resulting surface treated article was qualitatively shown, such as through touch and feel on the skin, to exhibit increased lubricity compared to an untreated surface.

Working Example 7

In this working example a composition comprising dodecyltriethoxysilane (2.3 wt %), octadecylphosphonic acid (0.13 wt %), tetraethoxysilane (2.3 wt %), 1,8-bis(triethoxysilyl)octane (2.3 wt %), silicone polyol copolymer (1.8 wt %) in methylcyclohexane (63 wt %), and ethanol (27 wt %) was applied to a glass substrate by dipping the substrate in the composition for 1 minute, followed by air curing for 24 hours before rinsing with the solvent.

The treated substrate shows a friction reduction of at least 10% compared to an untreated surface measured using a nanoindenter.

Comparative Example 1

The following comparative composition was made without an adjacent polymer: A composition comprising tetraethoxysilane (4.5 wt %), octadecylphosphonic acid (1.5 wt %), dodecyl(triethoxy)silane (2.5 wt %), 1,8-bis(triethoxysilyl)octane (2.5 wt %) in methylcyclohexane and ethanol (70:30 vol % respectively) was applied to a stainless steel substrate by dipping it in the said composition for 1 minute, followed by air curing for 24 hours before rinsing with the solvent.

The resulting treated surface showed reduced corrosion resistance after 36 hours in ocean water immersion compared to the treated substrates described in Working Example 1.

Comparative Example 2

The following comparative composition was made without a first part of the composition: a composition comprising silicone copolymer polyol (4 wt %) in methylcyclohexane (96 wt %) was applied to a substrate by dipping it in the composition for 1 minute, which was followed by air curing for 24 hours before rinsing with solvent.

The resulting composition was unstable and not functional, as evidenced by no material being left after rinsing/wiping.

INDUSTRIAL APPLICABILITY

The present disclosure describes compositions that can have a wide range of uses because of one or more described properties. For example, in some embodiments, the compositions can be used in applications that have a need for a low friction or stiction coating. Non-limiting advantages of the composition and articles of the present disclosure include: a replacement material for those compositions currently using fluorine-based dry lubricants; a lubricant for consumer goods with metal or metal oxide assemblies; and a lubricant for articles comprising metal chains, including jewelry, braided bands, including watch bands, and the like.

More generally, the disclosed compositions can be used as a standalone hydrophobic surface treatment for a number of material surfaces, such as metals, metal oxides, glass, and acrylics. Non-limiting examples of such uses include coatings on windows, screens, monitors, high-touch surfaces, electronic products, housing for electronics, and combinations thereof. Hydrophobic coatings can be used in virtually any application where enhanced visibility is desired, and thus there is a need to cause water to bead and roll off. For example, it can be applied to car windshields, windows, and bodywork or any place which is exposed to rainy conditions and there is a need for the water to bead up and roll off.

Hydrophobic coatings described herein can be applied to electronic devices such as smartphones, tablets, and cameras to protect them from water damage. These coatings can create a barrier that repels water and prevents it from entering sensitive components, thus increasing the device's durability and reliability.

In addition, a reduced friction surface and improved corrosion resistance imparted by the described composition can improve the efficiency and performance of machinery and manufacturing processes. For example, bearings, gears, and other moving parts can operate more smoothly, leading to lower energy consumption, reduced wear and tear, and extended equipment lifespan.

In some embodiments, decreasing friction in sports equipment, especially if used in challenging or corrosive environment, such as fishing, skiing, snowboarding, ice hockey, snorkeling/diving, and biking, can enhance performance and user experience by improving a variety of properties, such as reducing fogging (such as on masks or goggles), reducing drag, improving speed, and increasing maneuverability.

The foregoing description is presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of this disclosure are apparent from this detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

Other embodiments will be apparent from consideration of the specification and practice of the embodiments disclosed herein. It is intended that the specification and examples be considered as examples only, with a true scope and spirit of the disclosed embodiments being indicated by the following claims.

We claim:

1. A composition for decreasing at least one of friction or stiction of a surface, the composition comprising:
   a first part comprising:
   (a) at least one organosilane; or
   (b) a combination of at least one organosilane and at least one organophosphorus, and
   a second part comprising at least one polymer,
   wherein (a) or (b) of the first part is configured as an attached layer on the surface, and the at least one polymer of the second part is adjacent to the attached layer,
   wherein the first part comprises at least one organosilane comprising only leaving groups and at least one organosilane comprising at least one non-leaving group, wherein the weight ratio of silanes with only leaving groups to silanes with at least one non-leaving group ranges between 1 to 100 and 10 to 1, and
   wherein the first part and the second part of the composition are found in an amount sufficient to decrease friction, stiction or both, of the surface relative to the surface in untreated form.

2. The composition of claim 1, wherein the at least one organosilane comprising only leaving groups or the at least one organosilane comprising at least one non-leaving group comprises an alkoxy or a chloride group.

3. The composition of claim 1, wherein the at least one non-leaving group comprises an alkyl, aromatic, silane, silicone, unsaturated (vinyl), epoxy, thiol, or cyclic group.

4. The composition of claim 3, wherein the alkyl group has between 1 to 100 carbons.

5. The composition of claim 4, wherein the at least one organosilane includes an alkyl group and comprises dodecyl triethoxysilane, octadecyl trimethoxysilane, octadecyltriethoxysilane, hexadecyltrichlorosilane, or derivatives of those compounds.

6. The composition of claim 3, wherein the at least one organosilane includes an aromatic group and comprises 1-napthyltrimethoxysilane, p-tolyltrimethoxysilane, phenyltriethoxysilane, benzyltriethoxysilane, or derivatives of those compounds.

7. The composition of claim 3, wherein the at least one organosilane includes an unsaturated (vinyl) group and comprises vinyltrimethoxysilane, allyltrimethoxysilane, or derivatives of those compounds.

8. The composition of claim 3, wherein the at least one organosilane includes a thiol group and comprises 3-(trimethoxysilyl) propanethiol, 11-mercaptoundecyltrimethoxysilane, bis[3-(triethoxysilyl) propyl]disulfide, bis [3-(triethoxysilyl) propyl]tetrasulfide, or derivatives of those compounds.

9. The composition of claim 3, wherein the at least one organosilane includes an epoxy group and comprises 2-(3, 4-epoxycyclohexyl)ethyltrimethoxysilane, (3-glycidoxypropyl) trimethoxysilane, or derivatives of those compounds.

10. The composition of claim 3, wherein the at least one organosilane includes a cyclic group and comprises cyclohexyltrichlorosilane, cyclopentyltrimethoxysilane, cyclopentyltrichlorosilane, or derivatives of those compounds.

11. The composition of claim 3, wherein the at least one organosilane includes an additional silane group and comprises 1,2-bis(triethoxysilyl) ethane, 1,8-bis(triethoxysilyl) octane, bis(trimethoxysilylethyl)benzene, 1,2-bis (trimethoxysilyl) decane, 1,6-bis(trimethoxysilyl) hexane, tris(triethoxysilylpropyl)amine or derivatives of those compounds.

12. The composition of claim 1, wherein the organophosphorus comprises a molecule that has at least one group comprising an alkyl, aromatic, silicone, unsaturated (vinyl), epoxy, thiol, phosphonic acid, or cyclic group.

13. The composition of claim 12, wherein the alkyl group has between 1 to 100 carbons.

14. The composition of claim 1, wherein the organophosphorus comprises methyl phosphonic acid, (2,4-xylyl)phosphonic acid, octadecylphosphonic acid, (aminomethyl)phosphonic acid, 6-phosphonohexanoic acid, hexadecylphosphonic acid, n-Dodecylphosphonic acid, (12-phosphonododecyl)phosphonic acid, 1,4-phenylenebis (phosphonic acid), N,N'-2-methylpiperazinebis(methylene phosphonic acid), or combinations thereof.

15. The composition of claim 1, wherein the second part comprises a polymer with a molecular weight of 1 kDa to 10000 kDa.

16. The composition of claim 1, wherein the at least one polymer comprises a silicone, polyolefin, polystyrene, rubber, wax, polyether, copolymers thereof, or combinations thereof.

17. The composition of claim 16, where the silicone comprises polydimethylsiloxane, polyphenylsiloxane, copolymers thereof, or combinations thereof.

18. The composition of claim 16, where the polyolefin comprises polyethylene, polypropylene, polybutene, polyisobutylene, polyisoprene, copolymers thereof, or combinations thereof.

19. The composition of claim 16, where the wax comprises waxes based on ethylene bis(stearamide), carnauba wax, lanolin, is part of a wax emulsion, or combinations thereof.

20. The composition of claim 1, wherein the polymer includes hydroxyl, silanol, amine, aldehyde, or thiol functional groups, or combinations thereof.

21. The composition of claim 1, wherein the total amount of the first and the second part combined constitutes 0.1 to 98 weight percent of the composition.

22. The composition of claim 1, wherein the weight ratio of the first part to the second part ranges between 10 to 1 and 1 to 10.

23. The composition of claim 1, wherein the organophosphorus comprises 0.01 to 90 weight percent of the first part.

24. The composition of claim 1, which further imparts enhanced hydrophobicity to said surface, as evidenced by an increase in water contact angle on said surface compared to an untreated surface.

25. The composition of claim 1, which imparts enhanced anti-corrosion properties to said surface when said surface is exposed to salt water, sebum, sweat, damp heat or combinations thereof, compared to an untreated surface.

26. The composition of claim 1, which further comprises one or more additives.

27. The composition of claim 26, wherein the one or more additives are selected from triazole derivatives, hindered phenols, metal halides, and thioethers, or combinations thereof.

28. The composition of claim 1, further comprising a material having a two-dimensional morphology.

29. The composition of claim 28, wherein the material having a two-dimensional morphology comprises hexagonal boron nitride (hBN), molybdenum disulfide (MOS), graphene or combinations thereof.

30. A method of decreasing at least one of friction or stiction of a surface, the method comprising:
   applying to the surface of a material, a composition comprising:
      a first part comprising:
         (a) at least one organosilane; or
         (b) a combination of at least one organosilane and at least one organophosphorus, and
      a second part comprising at least one polymer,
      wherein (a) or (b) of the first part is configured as an attached layer on the surface, and the at least one polymer of the second part is adjacent to the said attached layer,
      wherein the first part comprises at least one organosilane comprising only leaving groups and at least one organosilane comprising at least one non-leaving group, wherein the weight ratio of silanes with only leaving groups to silanes with at least one non-leaving group ranges between 1 to 100 and 10 to 1, and
      wherein the first part and the second part of the composition are found in an amount sufficient to decrease friction, stiction or both, of the surface relative to the surface in untreated form.

31. An article comprising:
   at least one surface having a surface treatment thereon, said surface treatment having a composition comprising:
      a first part comprising:
         (a) at least one organosilane; or
         (b) a combination of at least one organosilane and at least one organophosphorus, and
      a second part comprising at least one polymer,
      wherein (a) or (b) of the first part is configured as an attached layer on the surface, and the at least one polymer of the second part is adjacent to the said attached layer,
      wherein the first part comprises at least one organosilane comprising only leaving groups and at least one organosilane comprising at least one non-leaving group, wherein the weight ratio of silanes with only leaving groups to silanes with at least one non-leaving group ranges between 1 to 100 and 10 to 1, and
      wherein the composition is found in an amount sufficient to decrease friction or stiction of the surface relative to the surface in untreated form.

\* \* \* \* \*